United States Patent Office 2,992,098
Patented July 11, 1961

2,992,098
PURIFICATION OF CRUDE TITANIUM METAL
Alex Boozenny, Henderson, Miles H. Kleinman, Boulder City, and Alexandre R. Tarsey, Henderson, Nev., assignors to Titanium Metals Corporation of America, New York, N.Y., a corporation of Delaware
No Drawing. Filed Nov. 22, 1957, Ser. No. 698,065
9 Claims. (Cl. 75—84.5)

This invention relates to the purification of titanium metal and more particularly to an improved process for removing halide salts and other impurities from subdivided sponge, granules, or powder of metallic titanium manufactured by reduction or electrolysis of titanium tetrachloride or other titanium compounds.

Metallic titanium may be produced by reduction of titanium tetrachloride with metallic magnesium according to the so-called Kroll process described in U.S. Patent No. 2,205,854. Crude titanium sponge produced by this process inevitably is contaminated by by-product magnesium chloride and unreacted metallic magnesium. Metallic titanium may also be produced by reduction of titanium tetrachloride with metallic sodium. The inherent efficiency of the sodium reduction process appears to be greater than that when magnesium is employed as a reducing agent, however, the crude titanium product is contaminated with sodium chloride by-products and to some extent by unreacted sodium or other sodium compounds. Electrolytic methods for producing metallic titanium have generally involved electrolysis of a titanium compound, for example, titanium tetrachloride, in a molten halide salt bath. The crude product from this process will also be contaminated by residual halide bath salts as well as possibly small percentages of other metals which may have been incidentally reduced during the process. It is known that halide salt impurities and unreacted metallic reducing agents as well as other impurities may be removed from crude unreacted titanium by acid leaching. It is also known that during such leaching process, hydrogen absorption by the metallic titanium during leaching may be substantially reduced or entirely prevented by employing acid leaching solutions containing oxidizing agents.

Care has been exercised in leaching of crude titanium to prevent the hydrogen ion concentration in the solution from becoming less than about 1 gram per liter. This residual acid concentration has heretofore been necessary, even at the completion of the leaching process, in order to prevent oxidation of the titanium metal surfaces. When the hydrogen ion concentration of acid leaching solutions heretofore employed has fallen below the critical amount the leached metal has often been found to have an oxidized surface coating which is extremely difficult to remove even with fresh, strong leaching solution, and which can generally only be removed by a strong acid treatment that actually attacks and to some extent dissolves the metal itself. Its retention on the metallic titanium surfaces has resulted in a serious increase in hardness of the purified metal.

Even though care is taken to prevent final acidity of the leaching acid solution from becoming too low, trouble is often experienced due to local depletion of acid strength when treating a comparatively large batch of subdivided titanium sponge, particularly of the type produced by the Kroll process in which the acid is actually being used up by reaction with the comparatively large amount of metallic magnesium present. Local depletion of acid strength may occur due to insufficient agitation or by reaction with localized high concentrations of magnesium in the crude metal. An oxidized coating results, readily apparent as a purple or gold color on the surface of the sponge particles obtained from certain locations in the leaching tank. Re-leaching of such locally oxidized sponge material with fresh strong leaching solution has not successfully removed the oxide.

It is, therefore, a principal object of this invention to provide an improved method for purifying crude metallic titanium. A further object of this invention is to provide an improved method for removing halide salt impurities from subdivided crude metallic titanium. Yet another object of this invention is to provide a method for leaching crude subdivided metallic titanium in which the leaching acid solution may be utilized to the point of substantial depletion of its acid strength. Still another object of this invention is to provide a method for leaching crude subdivided metallic titanium in which substantially improved effective employment of the acid leaching solution is obtained. A still further object of this invention is to provide a method for leaching crude subdivided metallic titanium which produces an improved grade of purified product. A still further object of this invention is to provide a method for leaching crude subdivided metallic titanium which will produce a purified titanium product characterized by the absence of a deleterious oxide coating. These and other objects of this invention will be apparent from the following detailed description thereof.

This invention in its broadest aspects contemplates leaching crude subdivided metallic titanium contaminated with halide salts and other impurities in an acidic oxidizing solution containing a titanium complexing agent selected from the group consisting of citric acid, tartaric acid, oxalic acid, lactic acid, glycolic acid, saccharic acid, malic acid, pyruvic acid, picolinic acid, glycerophosphoric acid, nitrolotriacetic acid, hexahydroxyheptonic acid, ethylene diaminetetracetic acid, mannitol, and soluble alkali and alkaline earth metal salts thereof, rinsing the titanium metal with water and drying it.

The general process of this invention stems from the discovery that the deleterious oxide coating which has previously been formed on the surface of leached metallic titanium has occurred not by actual corrosion or oxidation of the metal itself but as a result of precipitation, probably by hydrolysis, of oxidic titanium compounds from the leaching solution on to the titanium metal surface when the hydrogen ion concentration of the leaching solution has been below the minimum necessary to maintain such compounds in solution. The presence in the leaching solution of this invention, of a complexing agent as described, permits utilization of leaching solutions of substantially less acid strength than heretofore, and will permit if desired, utilization of such solutions to substantial depletion of their hydrogen ion concentrations without deleterious effect on the metallic titanium being processed.

The acid content of the acidic oxidizing solution employed in the practice of this invention may be obtained by the presence of any acid suitable and capable of dissolving particular impurities present. It may comprise hydrochloric acid, nitric acid, sulphuric acid or acetic acid. Sufficient acid is employed to produce the required acid strength and this may vary considerably depending on the origin of the crude subdivided metallic titanium and on the relative amounts and nature of the impurities present. For leaching sponge produced by the so-called Kroll process an acid strength with hydrogen ion concentration between 0.3 gram per liter and 5 grams per liter may be advantageously employed. For leaching sodium-reduced metallic titanium and that produced by electrolytic methods, a hydrogen ion concentration between 0.1 and 2 grams per liter has been found to produce excellent results.

Substantially any inorganic compound which is capable in aqueous acid solution of oxidizing elemental hydrogen to hydrogen ion may be employed as the oxidizing agent in the acidic oxidizing solution, with the exception under preferred conditions of compounds of, or containing, metals which in acid solution will also be complexed by the complexing agents present. If such compounds are employed sufficient complexing agent will be required to complex such metals as well as the titanium present. Among the oxidizing agents which have successfully been used, are nitric acid and acid solutions of nitrate salts such as sodium or potassium nitrate, $H_2O_2$, $NaClO_3$, $NaClO$, $NaClO_4$, $KBrO_3$, $KIO_3$, and oxidizing gases such as chlorine, oxygen, ozone and bromine. The oxidizing agent is usually dissolved in the acid solution. Some of the agents listed however, are only slightly soluble, particularly gases such as oxygen and ozone. In such instances it is desirable to add these gases by bubbling them through the solution during the leaching operation. In the case of chlorine and other gases, such elements may be formed in some manner in situ in the solution itself, if desirable or advantageous. Since some of the salts and elements used as oxidizing agents are only slightly soluble in the acid solution, it is sometimes desirable, although not essential, to control the rate of addition of either the oxidizing agent or the acid portion of the leaching solution.

The specific quantity of oxidizing agents to be employed under any particular conditions will depend upon a variety of factors such as for example, the type of oxidizing agent employed, the amount and nature of the contaminants which may be present, the physical form of the crude titanium and other operational variables. Sufficient oxidizing agent should be present to react with at least a major portion and preferably with all of the hydrogen which theoretically would be released if the oxidizing agent were not present in the leaching solution. An excess of this amount may be employed to insure superior results. In most cases it has been found that satisfactory results are obtained when at least 0.5% of the oxidizing agent up to its maximum solubility based on the weight of the leaching solution is employed. Preferably from about 0.5% to about 20% of the oxidizing agent should be used, and in the specific case of nitric acid wherein the agent itself is an acid and which will provide hydrogen ion concentration, amounts as high as 70% may be employed. In instances such as when treating metal produced by the Kroll process where a substantial amount of metallic magnesium will be reacted with the leaching solution, higher contents of oxidizing agent are desirable in the leaching solution to take care of the relatively large amount of hydrogen which will be otherwise released. In the case of crude metallic titanium produced by processes which do not result in the presence of appreciable amounts of acid reactable metallic impurities which would result in release of large amounts of hydrogen, the amount of oxidizing agent required in the leaching solution may be correspondingly lower.

The complexing agent contained in the acidic oxidizing solution acts to accomplish the objects of this invention by forming soluble complex compounds or combinations with titanium compounds which are present in the acidic oxidizing leaching solution. The precise nature of the complexing action is not fully understood, but it is now known, that when soluble titanium is complexed according to this invention, it will generally, in most cases, remain solubilized in the leach solution even when the hydrogen ion concentration of the solution has been substantially entirely depleted. It may sometimes occur, for reasons not known, possibly due to excessively high concentrations of lower titanium chlorides, temperature variations, or other factors, that the complexed titanium compound may decompose during the acid leaching to form oxidic titanium compounds which may be admixed or associated with the titanium metal. It is an extremely important characteristic however of such titanium oxide compounds that they are readily dissolved by an additional treatment with fresh leaching solution. Such oxidic titanium compounds are very different from those previously formed on the surface of metallic titanium when leach solutions not containing the complexing agent are employed, and which surface coatings are substantially insoluble even in hot, fresh, leaching solution and are extremely difficult to remove by any known method without appreciable attack on the metal itself. The proportions of complexing agent necessary in the leaching solution will depend upon the amount of soluble titanium compounds present. Such compounds may be dissolved in the leaching solution by reaction with titanium lower chlorides which exist as impurities in the crude metal, or by dissolution of other titanium impurity compounds or salts or even as result of slight action by the acid leaching solution on the metal itself. The presence of lower chlorides is common in sponge produced by the Kroll process even though an appreciable amount of unreacted metallic magnesium may also be present. This occurs because of space and distance effects in large Kroll reduction reactors; the localized existence of both titanium lower chlorides and unreacted reducing agent is not only possible but rarely avoided. The precise concentration of the dissolved titanium in the leaching solution is difficult to determine by routine analytical methods and therefore a reasonable excess of complexing agent over that presumedly required is advantageously employed. It has been found that between .01% and 8% by weight of the total weight of leaching solution is adequate under most circumstances. When leaching crude titanium produced by the electrolytic process or which has been reduced by metallic sodium, amounts of complexing agent in the lower portion of the range will produce satisfactory results. Generally speaking, when purifying crude titanium metal produced by the Kroll process or by any other method which ordinarily results in the presence of higher amounts of titanium lower chlorides or other soluble titanium compounds in the product, an amount of complexing agent in the higher portion of the described range will be most useful. An excess of a complexing agent over that specified above may be employed to insure greatest retention of titanium compounds as soluble complexes, however employment of unduly large amounts will unnecessarily increase the cost of the process.

Alkali and alkaline earth metal salts of the various acids referred to may be employed as complexing agents provided they are soluble in the acidic oxidizing leaching solution. Solubility of the complex forming radical is essential and in addition, such salts should not result in precipitation of insoluble compounds by reaction with other solution constituents, since this would affect the efficacy of such constituents and also cause further contamination of the titanium metal.

Of the group of titanium complexing agents enumerated above, citric acid, tartaric acid, glycerophosphoric acid, saccharic acid and hexahydroxyheptonic acid are preferred because of their effective action, availability and cost. Oxalic acid is most useful in leaching crude titanium metal which does not contain more than incidental quantities of magnesium or calcium since if these elements are present in appreciable quantities an undesirable precipitation of their corresponding oxalates may occur. Saccharic acid of grade and purity adequate for the practice of this invention may be prepared by oxidizing commercial sugar with an aqueous solution of nitric acid.

In carrying out the general process of this invention crude metallic titanium in subdivided form is preferably admixed with the leaching solution and maintained in contact therewith under suitable conditions of agitation until the impurities present have been solubilized. The leaching solution which is then spent is separated from the metallic titanium by settling, decantation, draining, filtering or any other convenient equivalent process, and residual solution remaining on the surface of the titanium metal particles is removed by rinsing with water. The rinsing may be accomplished by treating the titanium metal with a substantial amount of water as by successive washings followed by decantation or filtration, or by spray washing or by any other convenient and equivalent method. The titanium metal is then dried, for example by heating to a moderately elevated temperature (about 150° to 220° F.) in a current of dry air.

A significant difference between the process of this invention and that generally practiced previously occurs during the rinsing operation. It will be apparent that previously employed leaching solutions which have not contained a complexing agent must inevitably, during the rinsing step, be diluted in contact with the metallic titanium to a point where the hydrogen ion concentration is insufficient to maintain in solution, soluble titanium which may be present. Therefore, during the rinsing operation, as previously practiced, a small though not insignificant precipitation of oxidic titanium compounds has almost invariably occurred. When leaching solutions containing the titanium complexing agent of this invention are employed, however, the rinsing of leaching solution from the metallic titanium particles is readily accomplished without precipitation of oxidic titanium compounds since these are retained in solution during dilution of the acid strength by rinsing action down substantially to neutrality.

A selected embodiment of this invention may be applied to purification of crude titanium containing relatively large amount of metallic contaminants which must be dissolved by the acid content of the leaching solution. Such titanium occurs as the product from a Kroll type reaction and may contain from 10% to 30% or more unreacted metallic magnesium. In order to obtain highest utilization of the acid content of the leaching solution, subdivided crude metal is first treated with an amount of leach solution which will dissolve substantially all the impurity magnesium and in so doing will be reduced in acid strength to or near neutrality. Due to the presence of the complexing agent according to this invention, the titanium surface is not deleteriously affected. The spent leach solution whose acid content is substantially fully utilized is separated from the titanium metal and may be discarded. Then the titanium is leached with strong, fresh acid solution, preferably hot, to redissolve any titanium precipitate which may have formed and to clean up the metal which is subsequently separated, rinsed and dried. The leach solution used in this second step will have lost little of its acid strength and is subsequently employed as the first step leach solution applied to a fresh batch of crude titanium and its acid content substantially fully utilized as previously described. Employing each lot of leaching solution to provide a final leach to one batch of titanium and subsequently a first leach to a succeeding batch enables substantially full utilization of the acid content thereof without affecting the quality of the purified titanium.

The following examples will illustrate various modifications and embodiments of the practice of this invention:

*Example 1*

A portion of a batch of titanium metal produced by reduction of titanium tetrachloride with metallic magnesium, was prepared for leaching by crushing into particles of size of about ⅜ inch maximum. The crude titanium metal contained about 15% magnesium chloride, about 20% unreacted metallic magnesium and about 0.4% titanium lower chlorides (titanium dichloride and titanium trichloride) together with other incidental impurities.

An aqueous leaching solution containing the following constituents was prepared:

| | Percent |
|---|---|
| Hydrochloric acid | 10 |
| Sodium nitrate | 6 |
| Citric acid | 0.5 |

0.793 gallon of the leaching solution was run into a suitable tank and 1.04 pounds of the subdivided titanium metal was gradually added to the leaching solution. After all the titanium had been added, the admixture was agitated for 5 hours in order to insure complete solution of the magnesium and magnesium chloride and other soluble contaminants. The spent leaching solution was then separated from the titanium metal by decantation, and the acidity thereof was determined to be 0.35 gram of hydrogen ion per liter. The leached titanium metal was then rinsed with water and dried at a temperature of about 150° F.

The leached and purified titanium metal product showed a bright metallic surface with no indication of oxidation during leaching. A sample of the metal melted into a test button showed a Brinell hardness of 125. Analysis of the chips disclosed that the metallic magnesium and magnesium chloride content had been reduced below impurity specifications for such material in top grade titanium sponge.

*Example 2*

Another portion of the same crude titanium metal employed in Example 1 was crushed and subjected to a similar leaching operation with a solution containing the following:

| | Percent |
|---|---|
| Hydrochloric acid | 7.2 |
| Nitric acid | 5.2 |
| Sodium potassium tartrate | 2 |

The various steps in the leaching procedure were carried out in a manner identical to that described for Example 1, employing the same weight of crude metal and volume of leaching solution. The hydrogen ion concentration of the spent leaching solution was 0.35 gram per liter.

The purified metal obtained also showed a bright metallic surface and when tested, had a Brinell hardness of 125. The magnesium and magnesium chloride contents were also substantially eliminated.

*Example 3*

Another portion of the same crude titanium metal employed in Example 1 was crushed and subjected to a similar leaching operation with a solution containing the following:

| | Percent |
|---|---|
| Sulphuric acid | 15 |
| Sodium nitrate | 5 |
| Calcium glycerophosphate | 0.4 |

The various steps in the leaching procedure were carried out in a manner identical to that described for Example 1, employing the same weight of crude metal and volume of leaching solution. The hydrogen ion concentration of the spent leaching solution was 0.4 gram per liter.

The purified metal obtained also showed a bright metallic surface and when tested, had a Brinell hardness of 125. The magnesium and magnesium chloride contents were also substantially eliminated.

*Example 4*

Another portion of the same crude titanium metal employed in Example 1 was crushed and subjected to a similar leaching operation with a solution containing the following:

| | Percent |
|---|---|
| Hydrochloric acid | 10 |
| Sodium chlorate | 7 |
| Saccharic acid | 1.2 |

The various steps in the leaching procedure were carried out in a manner identical to that described for in Example 1, employing the same weight of crude metal and volume of leaching solution. The hydrogen ion concentration of the spent leaching solution was 0.36 gram per liter.

The purified metal obtained also showed a bright metallic surface and when tested, had a Brinell hardness of 127. The magnesium and magnesium chloride contents were also substantially eliminated.

*Example 5*

Another portion of the same crude titanium metal employed in Example 1 was crushed and subjected to a similar leaching operation with a solution containing the following:

| | Percent |
|---|---|
| Nitric acid | 16 |
| Hexahydroxyheptonic acid | 1.8 |

The various steps in the leaching procedure were carried out in a manner identical to that described for in Example 1, employing the same weight of crude metal and volume of leaching solution. The hydrogen ion concentration of the spent leaching solution was 0.3 gram per liter.

The purified metal obtained also showed a bright metallic surface and when tested, had a Brinell hardness of 124. The magnesium and magnesium chloride contents were also substantially eliminated.

*Example 6*

Another portion of the same crude titanium metal used in Example 1 was crushed and a charge of 1.14 pounds of the subdivided titanium metal was added to 0.793 gallon of the same leaching solution employed in Example 1. After agitating the admixture for 1 hour the solution was separated from the metal and determined to contain $10^{-6}$ grams of hydrogen ion per liter. The solution was discarded.

A slight precipitate had occurred associated with the metal particles which were then admixed with a fresh batch of 0.793 gallon of leaching solution of the same composition as previously used, but preheated to 170° F. After agitating the admixture for 3 hours the metal was separated by decantation of the solution and rinsed with water and dried at a temperature of about 200° F.

The leached and purified titanium metal product showed a bright metallic surface with no indication of oxidation during leaching. A sample of the metal melted into a test button showed a Brinell hardness of 125. Analysis of the chips disclosed that the metallic magnesium and magnesium chloride content had been reduced below impurity specifications for such material in top grade titanium sponge.

The leach solution used in the second leach step above was not discarded but was employed to treat another batch of crude titanium metal and after this use its acid content was reduced substantially to neutrality and the solution was then discarded. A similar fresh solution was used for final leaching of this batch of crude metal which then showed properties similar to those of the first batch leached. This leach solution was reserved for treatment of another batch of crude metal.

*Example 7*

A portion of a batch of crude titanium metal produced by reduction of titanium tetrachloride with metallic sodium was prepared for leaching by crushing into particles of size ⅜ inch maximum. The crude titanium metal contained 50% sodium chloride as the principal impurity with about 0.2% titanium lower chlorides ($TiCl_2$ and $TiCl_3$) and other incidental contaminants.

An aqueous leaching solution containing the following constituents was prepared:

| | Percent |
|---|---|
| Nitric acid | 5 |
| Citric acid | 0.2 |

0.793 gallon of the leaching solution was run into a suitable tank and 0.75 pound of the subdivided titanium metal was gradually added to the leaching solution. After all the titanium had been added, the admixture was agitated for 4 hours in order to insure complete solution of soluble contaminants. The spent leaching solution was then separated from the titanium metal by decantation, and the acidity thereof was determined to be 0.8 gram of hydrogen ion per liter. The leached titanium metal was then rinsed with water and dried at a temperature of about 200° F.

The leached and purified titanium metal product showed a bright metallic surface with no indication of oxidation during leaching. A sample of the metal melted into a test button showed a Brinell hardness of 105. Analysis of the purified metal disclosed that the impurity content had been reduced below impurity specifications for such material in top grade titanium sponge.

*Example 8*

A portion of a batch of crude titanium metal produced by electrolysis of titanium tetrachloride in a molten halide salt bath following the general principles of the process of U.S. Patent No. 2,749,295 was prepared for leaching by crushing into particles of maximum size of about ⅜ inch. The crude titanium metal contained about 40% sodium chloride as residue from the sodium chloride electrolyte and about 1% titanium lower chlorides ($TiCl_2$ and $TiCl_3$) together with trace amounts of incidental impurities.

An aqueous leaching solution containing the following constituents was prepared:

| | Percent |
|---|---|
| Hydrochloric acid | 3 |
| Sodium nitrate | 3 |
| Citric acid | 0.5 |

0.793 gallon of the leaching solution was run into a suitable tank and 0.75 pound of the subdivided titanium metal was gradually added to the leaching solution. After all the titanium had been added, the admixture was agitated for 4 hours in order to insure complete solution of the chlorides and other soluble contaminants. The spent leaching solution was then separated from the titanium metal by decantation, and the acidity thereof was determined to be 0.9 gram of hydrogen ion per liter. The leached titanium metal was then rinsed with water and dried at a temperature of about 200° F.

The leached and purified titanium metal product showed a bright metallic surface with no indication of oxidation during leaching. A sample of the metal melted into a test button showed a Brinell hardness of 120. Analysis of the chips disclosed that the impurity content had been reduced below impurity specifications for such material in top grade titanium sponge.

As a comparison to show results obtained when the leaching solution is employed without the complexing agent constituent, a test run was conducted similar to that described in Example 1, except that the citric acid was not present in the leaching solution. The titanium metal after leaching showed a gold and purple surface coating which could not be removed even with an additional treatment with hot fresh leach solution. A sample of the leached metal was melted into a button which showed a Brinell hardness number of 180.

The process of this invention makes possible more complete utilization of the acid content of leaching solutions employed as described. This feature is particularly valuable when leaching crude titanium metal which contains relatively large amounts of acid consuming metals such as magnesium, generally present in the product of the so called Kroll process. When leaching crude titanium relatively free from such metals the process of this invention permits employment of more dilute acid solutions than have been employed previously without danger of deleterious effect on the titanium surface. Also, in all cases, the complexing agent protects the titanium during the water rinsing operation, during which, inevitably, the hydrogen ion concentration of the solution is reduced below that which will prevent harmful hydrolysis and precipitation of oxidic titanium compounds.

We claim:

1. A method for purifying crude subdivided metallic titanium which contains magnesium chloride and other impurities which comprises: admixing said metallic titanium with an acidic oxidizing solution containing a titanium complexing agent selected from the group consisting of citric acid, tartaric acid, lactic acid, glycollic acid, saccharic acid, malic acid, pyruvic acid, picolinic acid, glycerophosphoric acid, nitrolotriacetic acid, hexahydroxyheptonic acid, ethylene diaminetetracetic acid, mannitol, and the soluble alkali and alkaline earth metal salts thereof; separating said solution from said metallic titanium; rinsing said metallic titanium with water; and drying said metallic titanium.

2. A process according to claim 1 in which the complexing agent is citric acid.

3. A process according to claim 1 in which the complexing agent is tartaric acid.

4. A process according to claim 1 in which the complexing agent is glycerophosphoric acid.

5. A process according to claim 1 in which the complexing agent is saccharic acid.

6. A process according to claim 1 in which the complexing agent is hexahydroxyheptonic acid.

7. A process according to claim 1 in which the complexing agent is present in the acidic oxidizing solution in amount from 0.01% to 8% by weight of said solution.

8. A process according to claim 1 in which the crude metallic titanium and the acidic oxidizing solution containing the complexing agent are admixed in such proportions that said solution when spent contains less than 1 gram per liter of hydrogen ion.

9. A method for purifying crude subdivided metallic titanium which contains magnesium chloride and metallic impurities which comprises: admixing said metallic titanium with an acidic oxidizing solution containing a titanium complexing agent selected from the group consisting of citric acid, tartaric acid, lactic acid, glycollic acid, saccharic acid, malic acid, pyruvic acid, picolinic acid, glycerophosphoric acid, nitrolotriacetic acid, hexahydroxyheptonic acid, ethylene diaminetetracetic acid, mannitol, and soluble alkali and alkaline earth metal salts thereof; separating said solution from said metallic titanium; admixing said metallic titanium with a fresh amount of said solution, separating said solution from said metallic titanium, rinsing said metallic titanium with water; and drying said metallic titanium.

References Cited in the file of this patent

UNITED STATES PATENTS

| | | |
|---|---|---|
| 2,697,660 | Sibert | Dec. 21, 1954 |
| 2,749,217 | Deutschman | June 5, 1956 |
| 2,816,020 | Quin | Dec. 10, 1957 |
| 2,864,690 | Lee et al. | Dec. 16, 1958 |

FOREIGN PATENTS

| | | |
|---|---|---|
| 738,149 | Great Britain | Oct. 5, 1955 |